United States Patent
Takada et al.

(10) Patent No.: US 12,403,826 B2
(45) Date of Patent: Sep. 2, 2025

(54) NOTIFICATION METHOD, NOTIFICATION SYSTEM, AND VEHICLE

(71) Applicant: TOYOTA JIDOSHA KABUSHIKI KAISHA, Toyota (JP)

(72) Inventors: Arata Takada, Toyota (JP); Tomohiro Miwa, Inazawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 71 days.

(21) Appl. No.: 18/383,661

(22) Filed: Oct. 25, 2023

(65) Prior Publication Data
US 2024/0174172 A1    May 30, 2024

(30) Foreign Application Priority Data
Nov. 24, 2022    (JP) .................. 2022-187518

(51) Int. Cl.
  *G08B 21/06*    (2006.01)
  *B60Q 9/00*    (2006.01)

(52) U.S. Cl.
  CPC ...................... *B60Q 9/00* (2013.01)

(58) Field of Classification Search
  USPC .... 340/439, 457.1, 435, 436, 446–449, 464, 340/488, 515, 539.21, 545.3, 568.1, 340/636.11
  See application file for complete search history.

(56) References Cited

U.S. PATENT DOCUMENTS

| | | | |
|---|---|---|---|
| 9,964,950 B2 * | 5/2018 | Takano | G01C 21/3626 |
| 10,017,116 B2 * | 7/2018 | Sato | G06F 3/14 |
| 10,310,508 B2 * | 6/2019 | Kunisa | B60W 60/0057 |
| 10,452,930 B2 | 10/2019 | Sato | |
| 10,663,973 B2 | 5/2020 | Hashimoto et al. | |
| 10,895,875 B2 | 1/2021 | Hashimoto et al. | |
| 11,001,198 B2 | 5/2021 | Morimura et al. | |
| 11,275,382 B2 | 3/2022 | Hashimoto et al. | |
| 2009/0079557 A1 * | 3/2009 | Miner | G08B 21/0258 340/457.1 |
| 2010/0022280 A1 * | 1/2010 | Schrage | H04M 1/58 455/567 |

(Continued)

FOREIGN PATENT DOCUMENTS

| | | |
|---|---|---|
| EP | 3 822 931 A1 | 5/2021 |
| JP | 2019-159711 A | 9/2019 |

OTHER PUBLICATIONS

Mercedes-Benz. "E-Class Estate Operator's Manual", Feb. 25, 2022, XP093150664.

(Continued)

*Primary Examiner* — Daniel Previl
(74) *Attorney, Agent, or Firm* — Oliff PLC

(57) ABSTRACT

A notification method for giving a notification to a driver sitting in a driver's seat of a vehicle includes: setting a target level of strength of the notification; when the target level is a first level, giving a visual notification from a visual device of the vehicle without giving a sound notification from a speaker of the vehicle; and when the target level is higher than the first level, giving a strong visual notification from the visual device or the sound notification from the speaker. The strong visual notification is stronger than the visual notification that is given when the target level is the first level.

7 Claims, 9 Drawing Sheets

(56) References Cited

U.S. PATENT DOCUMENTS

| | | | |
|---|---|---|---|
| 2010/0253526 A1 | 10/2010 | Szczerba et al. | |
| 2012/0294459 A1* | 11/2012 | Chapman | G10H 3/186 |
| | | | 381/98 |
| 2015/0198448 A1* | 7/2015 | Sanma | B62D 1/046 |
| | | | 701/400 |
| 2019/0276047 A1* | 9/2019 | Suzuki | G08B 3/10 |
| 2019/0342859 A1* | 11/2019 | Rubin | H04W 4/12 |
| 2020/0239022 A1* | 7/2020 | Hashimoto | G10K 15/02 |
| 2021/0229598 A1 | 7/2021 | Morimura et al. | |
| 2021/0237660 A1* | 8/2021 | Iwase | B60R 11/0217 |
| 2021/0380124 A1 | 12/2021 | Urano et al. | |

OTHER PUBLICATIONS

Mercedes-Benz. "Active Steering Assist," https://www.me.mercedes-benz-macao.com/en/passengercars/services/manuals.html/eclass-estate-2022-10-s213-mbux/videos/active-steering-assist, Apr. 12, 2024, 3 pages.

Apr. 29, 2024 extended Search Report issued in European Patent Application No. 23207257.9.

* cited by examiner

FIG. 4
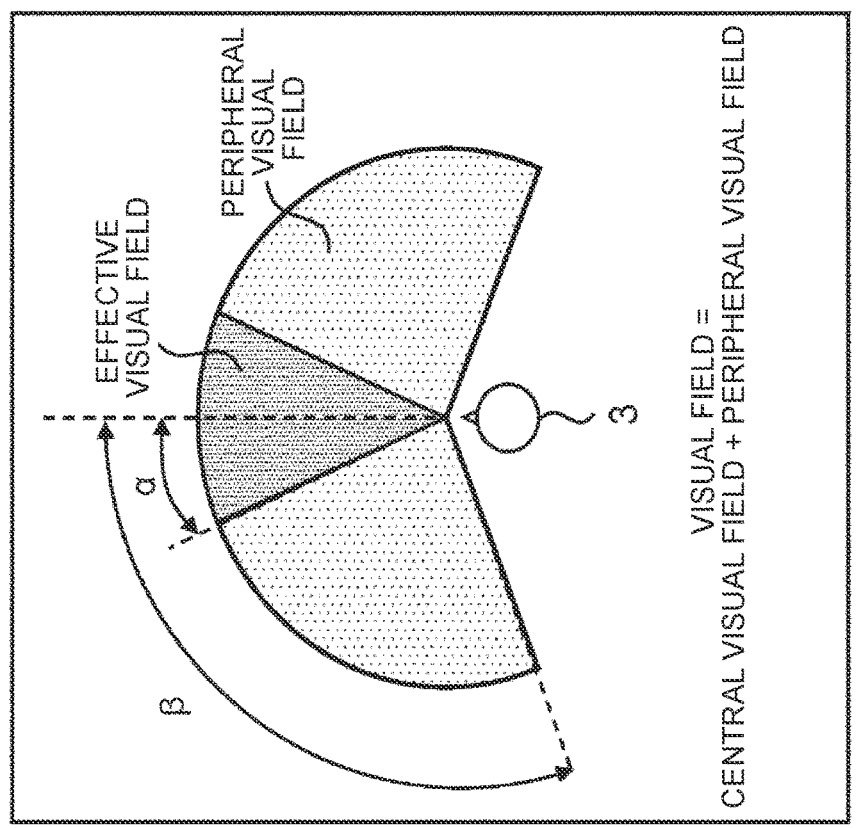
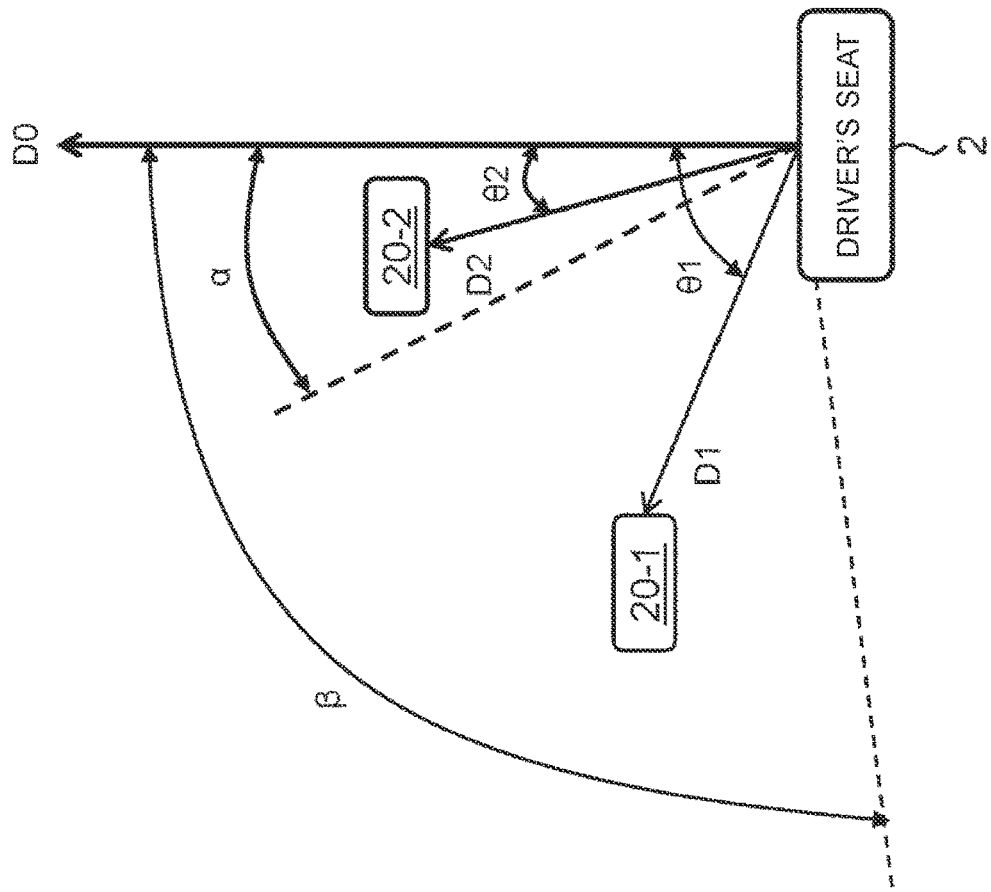

FIG. 8

|     | TARGET LEVEL L1 | TARGET LEVEL L2 | TARGET LEVEL L3 |
|-----|-----------------|-----------------|-----------------|
| (A) | FIRST VISUAL NOTIFICATION NV1 | SECOND VISUAL NOTIFICATION NV2 | SOUND NOTIFICATION NA |
| (B) | FIRST VISUAL NOTIFICATION NV1 | SECOND VISUAL NOTIFICATION NV2 | |
| (C) | FIRST VISUAL NOTIFICATION NV1 | | SECOND VISUAL NOTIFICATION NV2 |
| (D) | VISUAL NOTIFICATION NV | SOUND NOTIFICATION NA | |
| (E) | VISUAL NOTIFICATION NV | | SOUND NOTIFICATION NA |

NOTIFICATION METHOD, NOTIFICATION SYSTEM, AND VEHICLE

CROSS-REFERENCE TO RELATED APPLICATION

This application claims priority to Japanese Patent Application No. 2022-187518 filed on Nov. 24, 2022, incorporated herein by reference in its entirety.

BACKGROUND

1. Technical Field

The present disclosure relates to notification methods, notification systems, and vehicles.

2. Description of Related Art

Japanese Unexamined Patent Application Publication No. 2019-159711 (JP 2019-159711 A) discloses an alertness maintaining device for maintaining the level of alertness of a driver of a vehicle. When a decrease in level of alertness of the driver is detected, the alertness maintaining device gives a sound stimulus of intensity corresponding to the level of alertness to the driver.

SUMMARY

According to the technique disclosed in JP 2019-159711 A, a sound stimulus is given to the driver of the vehicle. Sound stimuli are considered to be intense and effective. However, because of their intensity, drivers feel that the sound stimuli are too much. That is, drivers feel annoyed by the sound stimuli.

The present disclosure provides a technique capable of giving a notification of appropriate strength to a driver of a vehicle.

A first aspect of the present disclosure is a notification method for giving a notification to a driver sitting in a driver's seat of a vehicle. The notification method includes: setting a target level of strength of the notification; when the target level is a first level giving a visual notification from a visual device of the vehicle without giving a sound notification from a speaker of the vehicle; and when the target level is higher than the first level, giving a strong visual notification from the visual device or the sound notification from the speaker. The strong visual notification is stronger than the visual notification that is given when the target level is the first level.

In the first aspect, when the target level is the first level, the sound notification may not be given from the speaker and a first visual notification may be given from a first visual device. The visual device may include the first visual device. When the target level is a second level, the sound notification may not be given from the speaker and a second visual notification may be given from a second visual device. The visual device may include the second visual device. The second level may be higher than the first level. A first angle between a first direction and a forward direction may be greater than a second angle between a second direction and the forward direction. The forward direction may be a direction from the driver's seat toward front of the vehicle, and the first direction may be a direction from the driver's seat toward the first visual device. The second direction may be a direction from the driver's seat toward the second visual device.

In the first aspect, the first angle may be greater than a reference angle and may be smaller than a limit angle. The reference angle may be half an angle of a human's average effective visual field, and the limit angle may be half an angle of a human's average visual field. The second angle may be smaller than the reference angle.

In the first aspect, when the target level is a third level, the sound notification may be given from the speaker. The third level may be higher than the second level.

In the first aspect, the notification method may further include: determining whether the notification to the driver is necessary; and determining whether the driver reacts to the visual notification when the target level is the first level. When the notification to the driver is necessary, the target level may be initialized to the first level. When the driver does not react to the visual notification, the target level may be set to a level higher than the first level.

In the first aspect, the notification method may further include: determining whether the notification to the driver is necessary; determining whether the driver reacts to the first visual notification; and determining whether the driver reacts to the second visual notification. When the notification to the driver is necessary, the target level may be initialized to the first level. When the driver does not react to the first visual notification, the target level may be set to the second level. When the driver does not react to the second visual notification, the target level may be set to the third level.

A second aspect of the present disclosure is a notification system that gives a notification to a driver sitting in a driver's seat of a vehicle. The notification system includes one or more processors. The one or more processors are configured to set a target level of strength of the notification. The one or more processors are configured to, when the target level is a first level, give a visual notification from a visual device of the vehicle without giving a sound notification from a speaker of the vehicle. The one or more processors are configured to, when the target level is higher than the first level, give a strong visual notification from the visual device or the sound notification from the speaker. The strong visual notification is stronger than the visual notification that is given when the target level is the first level.

In the second aspect, a first angle between a first direction and a forward direction may be greater than a second angle between a second direction and the forward direction. The forward direction may be a direction from the driver's seat toward front of the vehicle. The first direction may be a direction from the driver's seat toward a first visual device. The second direction may be a direction from the driver's seat toward a second visual device. The one or more processors may be configured to, when the target level is the first level, give a first visual notification from the first visual device without giving the sound notification from the speaker. The visual device may include the first visual device. The one or more processors may be configured to, when the target level is a second level, give a second visual notification from the second visual device without giving the sound notification from the speaker. The visual device may include the second visual device. The second level may be higher than the first level.

A third aspect of the present disclosure is a vehicle. The vehicle includes a visual device, a speaker, and a control device that is configured to control a notification to a driver sitting in a driver's seat. The control device is configured to set a target level of strength of the notification. The control device is configured to, when the target level is a first level, give a visual notification from the visual device without giving a sound notification from the speaker. The control device is configured to, when the target level is higher than the first level, give a strong visual notification from the visual device or the sound notification from the speaker. The strong visual notification is stronger than the visual notification when that is given the target level is the first level.

In the third aspect, a first angle between a first direction and a forward direction may be greater than a second angle between a second direction and the forward direction. The forward direction may be a direction from the driver's seat toward front of the vehicle. The first direction may be a direction from the driver's seat toward a first visual device, and the second direction may be a direction from the driver's seat toward a second visual device. The control device may be configured to, when the target level is the first level, give a first visual notification from the first visual device without giving the sound notification from the speaker. The visual device may include the first visual device. The control device may be configured to, when the target level is a second level, give a second visual notification from the second visual device without giving the sound notification from the speaker. The visual device may include the second visual device. The second level may be higher than the first level.

According to the present disclosure, when the target level of the strength of the notification is low, no sound notification is given and a visual notification is given. A stimulus that is given to the driver by the visual notification is weaker than a stimulus that is given to the driver by the sound notification. Therefore, the driver is less likely to feel annoyed by the notification.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a conceptual diagram illustrating the positional relationship between a first visual device and a second visual device according to the embodiment;

FIG. 8 is a conceptual diagram showing various patterns of the notification control process according to the embodiment.

DETAILED DESCRIPTION OF EMBODIMENTS

An embodiment of the present disclosure will be described with reference to the accompanying drawings.

1. Notification System

Figure 1:
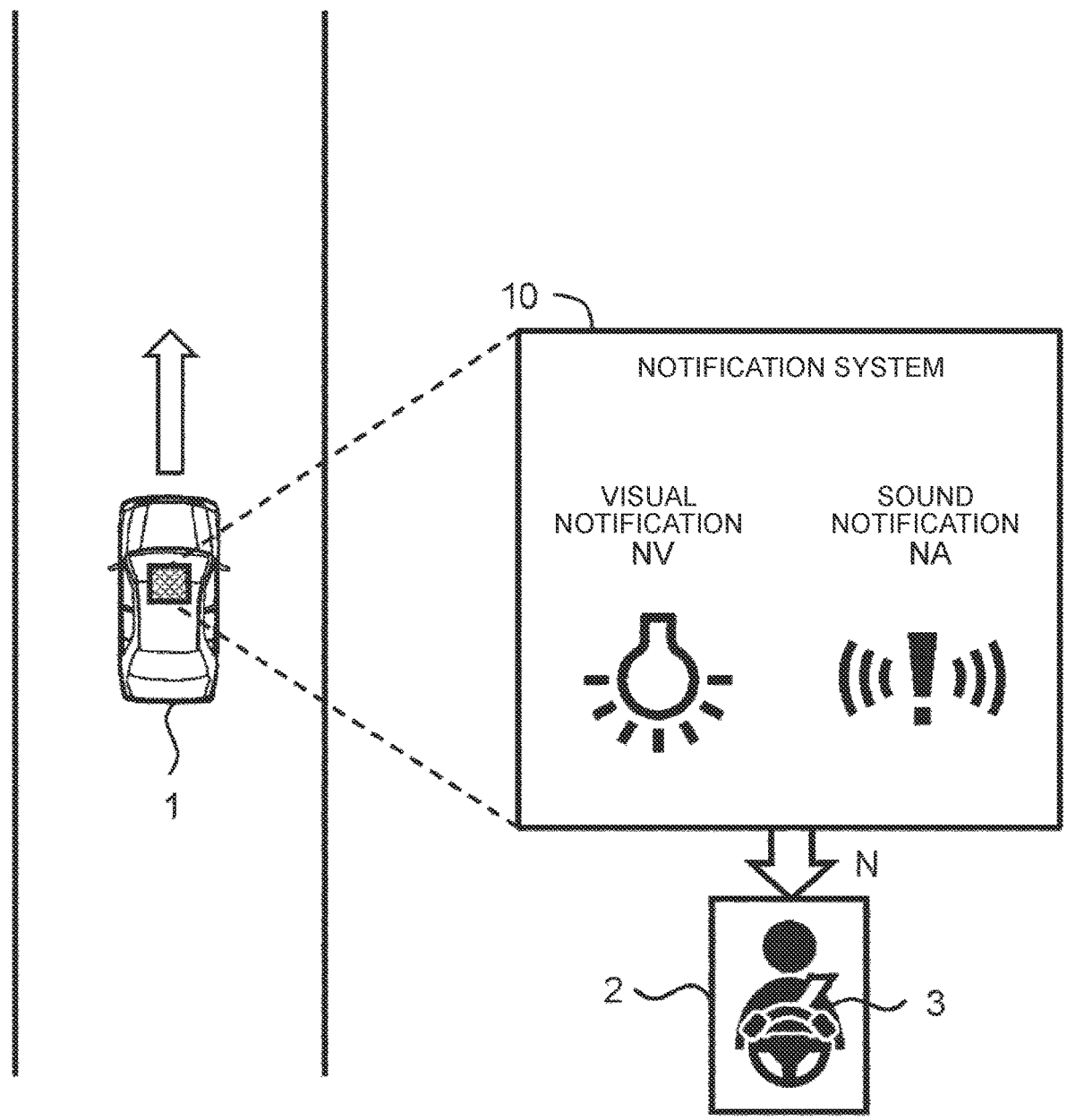
FIG. 1 is a conceptual diagram illustrating an overview of a notification system according to an embodiment.

FIG. 1 is a conceptual diagram illustrating an overview of a notification system 10 according to the present embodiment. The notification system 10 is mounted on a vehicle 1 and gives various notifications N to a driver 3 sitting in a driver's seat 2 of the vehicle 1. The vehicle 1 may be an autonomous vehicle. An operator sitting in the driver's seat 2, even during autonomous driving, is herein referred to as "driver 3."

The notification system 10 gives a notification N when a predetermined notification condition is satisfied. For example, the notification condition is that the level of alertness of the driver 3 falls below a threshold. As another example, the notification condition is that it becomes necessary to request the driver 3 to monitor the surroundings during autonomous driving of the vehicle 1. As still another example, the notification condition is that it becomes necessary to request the driver 3 to hold a steering wheel during autonomous driving of the vehicle 1. As yet another example, the notification condition is that it becomes necessary to request the driver 3 to switch to manual driving during autonomous driving of the vehicle 1. As a further example, the notification condition is that it becomes necessary to request the driver 3 to perform a braking operation. As a still further example, the notification condition is that driver assistance control for assisting with driving of the vehicle 1 is activated. Examples of the driver assistance control include collision avoidance control and lane departure prevention control.

Types of notifications N to the driver 3 include "visual notifications NV" and "sound notifications NA." The visual notifications NV are notifications using visual information such as light emission and display. The sound notifications NA are notifications using sound information such as a voice message and a beeping sound.

Figure 2:
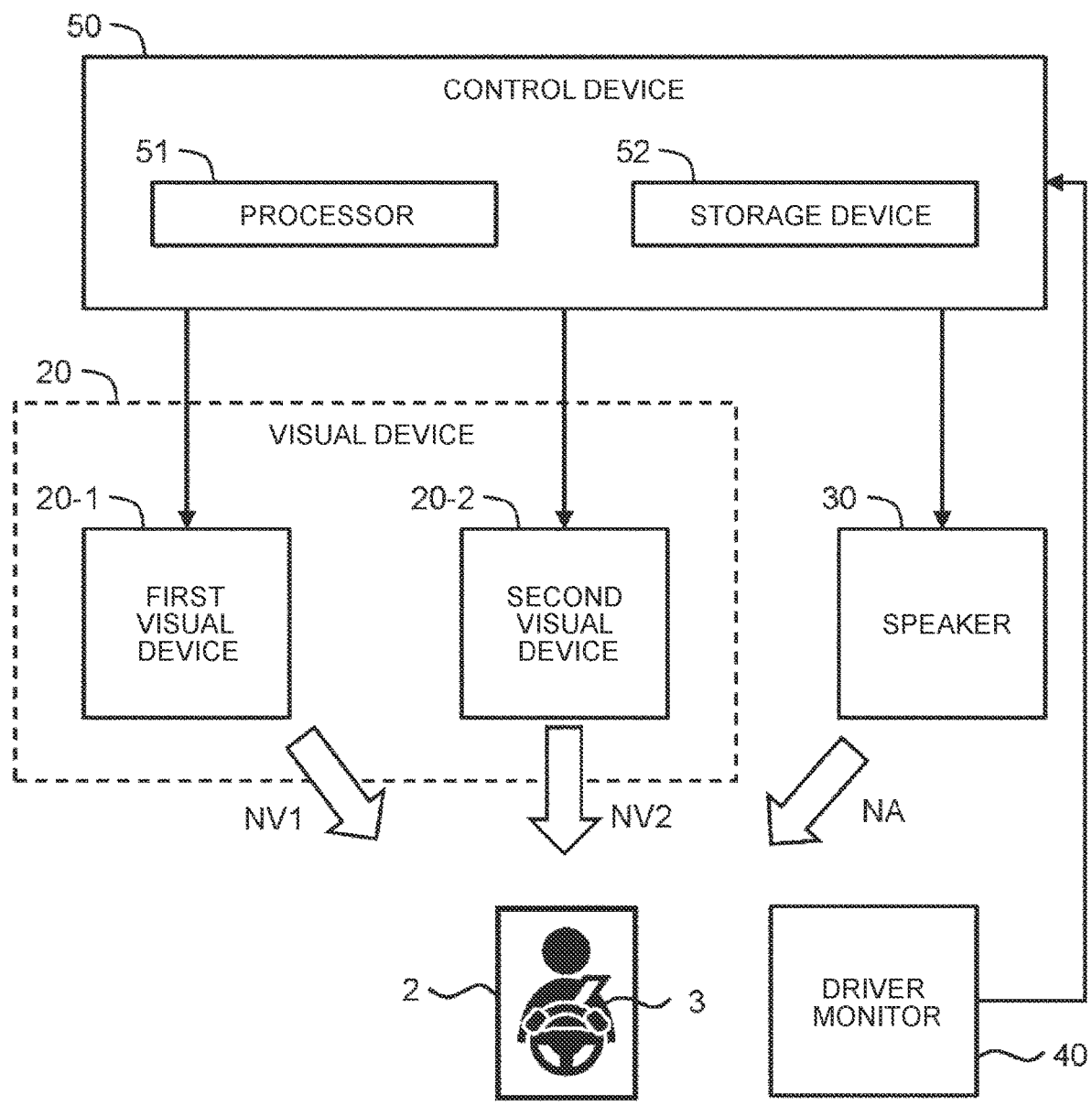
FIG. 2 is a block diagram showing an example of the configuration of the notification system according to the embodiment.

FIG. 2 is a block diagram showing an example of the configuration of the notification system 10 according to the embodiment. The notification system 10 includes a visual device 20, a speaker 30, a driver monitor 40, and a control device 50.

The visual device 20 gives visual notifications NV to the driver 3. Examples of the visual device 20 include a light-emitting device and a display panel. The light-emitting device is, for example, a light-emitting diode (LED). The light-emitting device can provide (convey) different kinds of information by emitting light in different colors. The display panel is, for example, a liquid crystal panel or an organic electroluminescence (EL) panel. The visual device 20 is typically installed inside the cabin of the vehicle 1.

The speaker 30 gives sound notifications NA to the driver 3. The speaker 30 is typically installed inside the cabin of the vehicle 1.

The driver monitor 40 is a device for detecting the state and behavior of the driver 3. For example, the driver monitor 40 includes a camera installed at a position where the camera can capture images of the driver 3. The driver monitor 40 may include a steering touch sensor installed on the steering wheel that is operated by the driver 3. The driver monitor 40 may detect driving operations of the driver 3.

The control device 50 controls the notification system 10. More specifically, the control device 50 controls notifications N to the driver 3 by controlling the visual device 20 and the speaker 30. The control device 50 also analyzes information detected by the driver monitor 40. For example, the control device 50 detects various states of the driver 3 by analyzing images captured by the camera. For example, the control device 50 can detect the face orientation, line of sight, eyes opening degree, mouth opening degree, etc. of the driver 3. The control device 50 can also determine whether the driver 3 is holding the steering wheel or has his or her hands off the steering wheel, based on the detection result from the steering touch sensor.

The control device 50 includes one or more processors 51 (hereinafter simply referred to as "processor 51") and one or more storage devices 52 (hereinafter simply referred to as "storage device 52"). The processor 51 performs various processes. The storage device 52 stores various kinds of information. Examples of the storage device 52 include a volatile memory, a nonvolatile memory, a hard disk drive (HDD), and a solid state drive (SSD). The processor 51 may execute a notification control program that is a computer program for controlling the notification system 10. The functions of the control device 50 are implemented through cooperation between the processor 51 that executes the notification control program and the storage device 52. The notification control program is stored in the storage device 52. Alternatively, the notification control program may be recorded on a computer-readable recording medium.

The notification system 10 may include a plurality of the visual devices 20. For example, the notification system 10 includes a first visual device 20-1 and a second visual device 20-2. The first visual device 20-1 gives a first visual notification NV1 to the driver 3. The second visual device 20-2 gives a second visual notification NV2 to the driver 3. As shown in FIG. 2, the visual device 20 may include the first visual device 20-1 and the second visual device 20-2.

Figure 3:
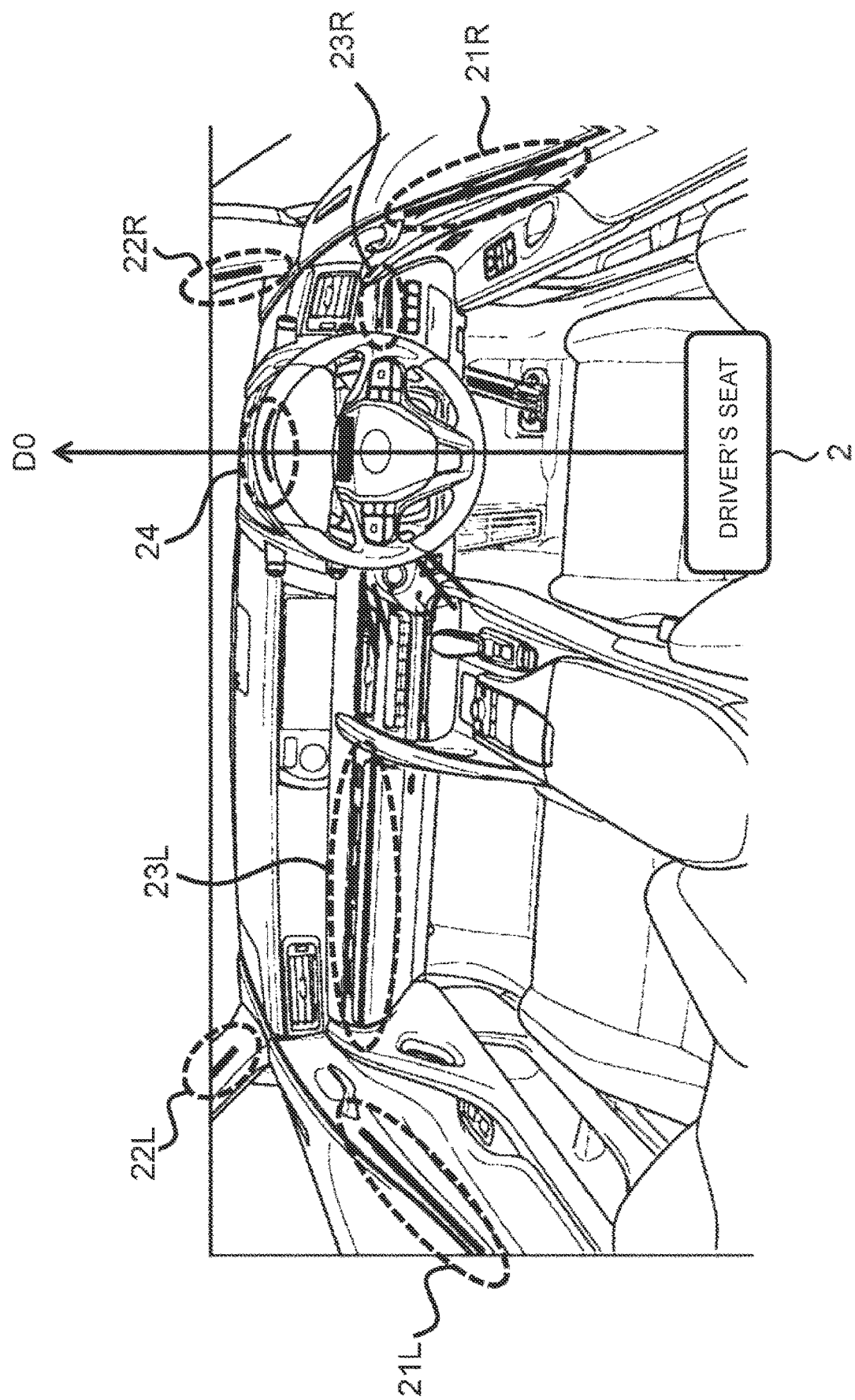
FIG. 3 shows an example of a plurality of visual devices mounted on a vehicle according to the embodiment.

FIG. 3 shows an example of the visual devices 20 mounted on the vehicle 1. The visual devices 20 include a door illumination 21 installed on a door, a pillar illumination 22 installed on a window frame, an instrument panel illumination 23 installed on an instrument panel, and a steering illumination 24 installed on the steering wheel. Each illumination is a light-emitting device including a plurality of LEDs. Each illumination is in a strip shape.

A forward direction D0 is a direction from the driver's seat 2 toward the front of the vehicle 1. In the example shown in FIG. 3, a door illumination 21L, a pillar illumination 22L, and an instrument panel illumination 23L are installed on the left side of the forward direction DO. A door illumination 21R, a pillar illumination 22R, and an instrument panel illumination 23R are installed on the right side of the forward direction DO. The steering illumination 24 is installed substantially on the forward direction DO.

FIG. 4 is a conceptual diagram illustrating the positional relationship between the first visual device 20-1 and the second visual device 20-2 according to the present embodiment. The forward direction D0 is a direction from the driver's seat 2 toward the front of the vehicle 1. A first direction D1 is a direction from the driver's seat 2 toward the first visual device 20-1. A second direction D2 is a direction from the driver's seat 2 toward the second visual device 20-2. A first angle θ1 is an angle between the first direction D1 and the forward direction DO. A second angle θ2 is an angle between the second direction D2 and the forward direction DO. As shown in FIG. 4, the first angle θ1 is greater than the second angle θ2. Therefore, when the driver 3 sitting in the driver's seat 2 is looking straight ahead (forward direction DO), the first visual device 20-1 is far from the gaze direction of the driver 3, and the second visual device 20-2 is close to the gaze direction of the driver 3.

A human's visual field is divided into an effective visual field (central visual field) and a peripheral visual field. Humans can clearly perceive objects in their effective visual field. On the other hand, humans can vaguely perceive objects in their peripheral visual field. Preferably, when the driver 3 sitting in the driver's seat 2 is looking straight ahead (forward direction DO), the first visual device 20-1 is in the peripheral visual field of the driver 3, and the second visual device 20-2 is in the central visual field of the driver 3.

The angle of a human's average visual field will be described. The angle of the human's average visual field is the average value of the angles of the visual fields of a certain number of humans. For example, the human's average visual field extends about 100 degrees laterally (total of about 200 degrees), and a human's average effective visual field extends about 30 degrees laterally (total of about 60 degrees). A reference angle α is half the angle of the human's average effective visual field (e.g., 30 degrees). A limit angle β is half the human's average visual field (e.g., 100 degrees). The first angle θ1 between the first direction D1 and the forward direction D0 may be greater than the reference angle α and smaller than the limit angle β. The second angle θ2 between the second direction D2 and the forward direction D0 may be smaller than the reference angle α.

In the example shown in FIG. 3 described above, there is a possibility that the door illumination 21L, the pillar illumination 22L, the instrument panel illumination 23L, and the door illumination 21R may belong to the first visual device 20-1. There is also a possibility that the steering illumination 24 may belong to the second visual device 20-2.

2. Notification Control Process

A stimulus that is given to the driver 3 by a sound notification NA is more intense than a stimulus that is given to the driver 3 by a visual notification NV. Sound notifications NA are effective in that sense. However, due to the intense stimuli of the sound notifications NA, the driver 3 may feel that the sound notifications NA are too much. That is, the driver 3 may feel annoyed by the sound notifications NA. Also, the sound notifications NA can be heard not only by the driver 3 but also by passengers. Therefore, the passengers may also feel annoyed by the sound notifications NA.

It is therefore desired to give notifications N of appropriate strength to the driver 3 of the vehicle 1. Therefore, the notification system 10 (control device 50) according to the present embodiment performs a "notification control process" as described below.

Figure 5:
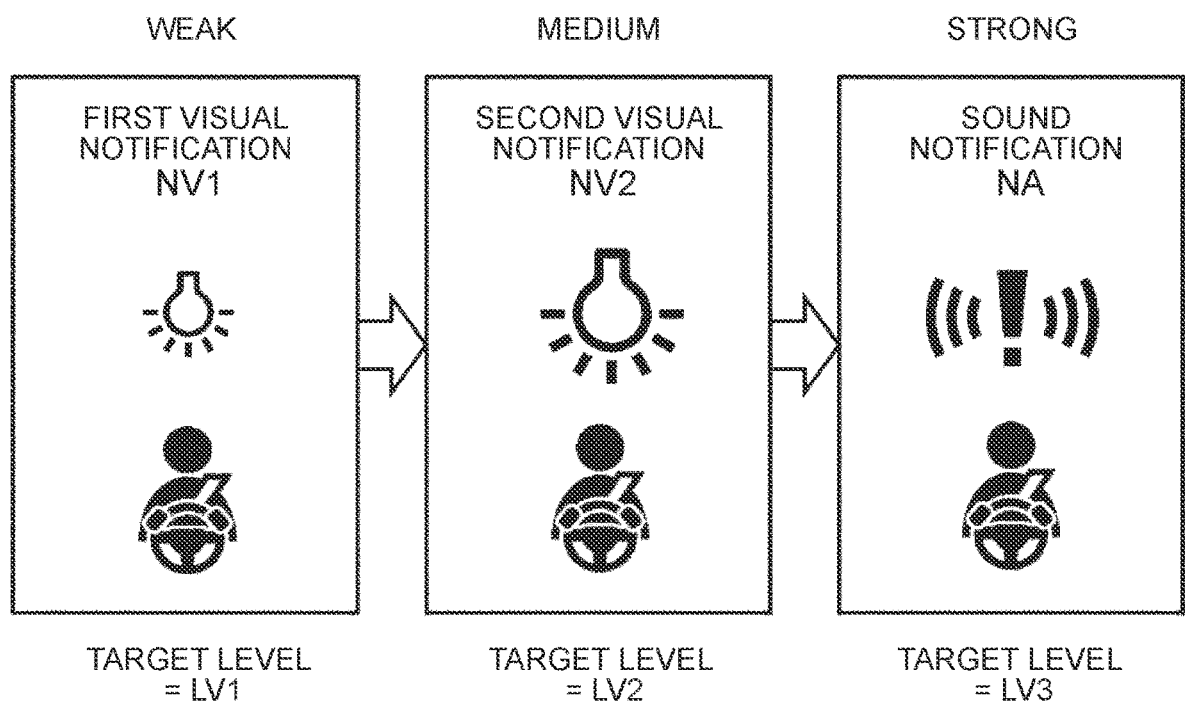
FIG. 5 is a conceptual diagram illustrating an overview of a notification control process according to the embodiment.

FIG. 5 is a conceptual diagram illustrating an overview of the notification control process according to the present embodiment. In the following description, the "strength of a notification N" means the "intensity of a stimulus that is given to the driver 3 by the notification N." The sound notifications NA from the speaker 30 are stronger than the visual notifications NV from the visual device 20. In other words, the visual notifications NV from the visual device 20 are weaker than the sound notifications NA from the speaker 30. Also, of the visual notifications NV, the second visual notification NV2 from the second visual device 20-2 is stronger than the first visual notification NV1 from the first visual device 20-1. In other words, the first visual notification NV1 from the first visual device 20-1 is weaker than the second visual notification NV2 from the second visual device 20-2.

The control device 50 sets (determines) a "target level" of the strength of a notification N. The control device 50 then determines the type of notification N to the driver 3 according to the target level. When the target level is relatively low, the control device 50 selects a relatively weak notification N. Specifically, when the target level is relatively low, the control device 50 does not give a sound notification NA from the speaker 30 and gives a visual notification NV from the visual device 20. When the target level is relatively high, the control device 50 selects a relatively strong notification N. Specifically, when the target level is relatively high, the control device 50 gives a stronger visual notification NV from the visual device 20 or gives a sound notification NA from the speaker 30.

For example, the target level includes the following three options: a first level LV1, a second level LV2, and a third level LV3. The second level LV2 is higher than the first level LV1, and the third level LV3 is higher than the second level LV2. When the target level is the first level LV1, no strong notification N is necessary, and the first visual notification NV1 is selected. When the target level is the third level LV3, a strong notification N is necessary, and a sound notification NA is selected. When the target level is the second level LV2, the second visual notification NV2 of intermediate strength is selected.

Effects

As described above, when the target level of the strength of a notification N is low, no sound notification NA is given but a visual notification NV is given. A stimulus that is given to the driver 3 by a visual notification NV is weaker than a stimulus that is given to the driver 3 by a sound notification NA. Therefore, the driver 3 is less likely to feel annoyed by the notification N. Moreover, since no sound notification NA is given, the passengers are less likely to feel annoyed by the notification N.

The visual notifications NV may include the first visual notification NV1 that is relatively weak and the second visual notification NV2 that is relatively strong. When the target level of the strength of a notification N is the first level LV1 that is very low, the first visual notification NV1 is selected. When the target level is the second level LV2 higher than the first level LV1, the second visual notification NV2 is selected. This provides finer notification control. That is, when the target level is the first level LV1 that is very low, the possibility of the driver 3 feeling annoyed by the notification N is effectively reduced. When the target level is the second level LV2 higher than the first level LV1, the attention of the driver 3 can be drawn to some extent while reducing the annoyance the driver 3 feels.

When the target level of the strength of a notification N is high, a sound notification NA is given. Since the sound notification NA gives an intense stimulus to the driver 3, the effect of the notification N is sufficiently obtained.

As described above, according to the present embodiment, a notification N of appropriate strength can be given to the driver 3 of the vehicle 1.

3. Examples of Notification Control Process

Examples of the notification control process according to the present embodiment will be described below.

3-1. First Example

Figure 6:
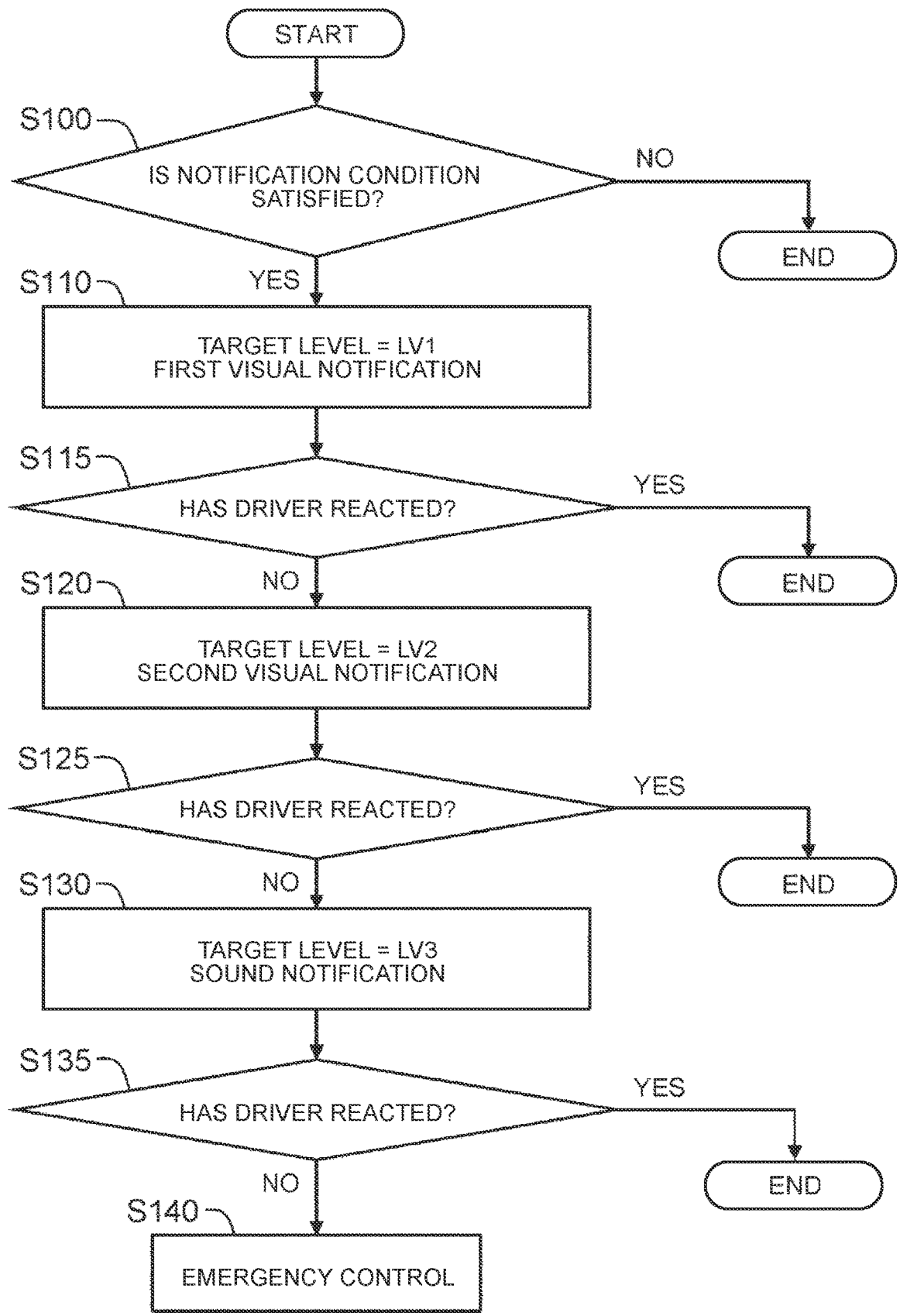
FIG. 6 is a flowchart showing a first example of the notification control process according to the embodiment.

FIG. 6 is a flowchart showing a first example of the notification control process.

In step S100, the control device 50 determines whether a notification condition is satisfied. In other words, the control device 50 determines whether a notification to the driver 3 is necessary.

For example, the notification condition is that the level of alertness of the driver 3 falls below a threshold. The control device 50 calculates the level of alertness of the driver 3 based on information detected by the driver monitor 40. Specifically, the control device 50 detects the face orientation, line of sight, eyes opening degree, mouth opening degree, etc. of the driver 3 by analyzing images acquired by the camera. For example, the level of alertness is calculated so that the smaller the eyes opening degree of the driver 3, the lower the level of alertness. As another example, the level of alertness is calculated so that the farther away the face orientation of the driver 3 is from the forward direction DO, the lower the level of alertness.

As another example, the notification condition is that any sign of drowsiness of the driver 3 is detected. Signs of drowsiness indicate a reduced level of alertness of the driver 3, and mean a state before and after the driver 3 feels drowsy. Typically, the signs of drowsiness appear as characteristic drowsy behavior before and after the driver 3 feels drowsy. Examples of the drowsy behavior include half-closed eyes, heavy eyelids, frequent blinking, long yawns, and head movements. The control device 50 detects signs of drowsiness of the driver 3 based on images captured by the camera of the driver monitor 40.

As still another example, the notification condition may be that it becomes necessary to request the driver 3 to monitor the surroundings during autonomous driving of the vehicle 1. As yet another example, the notification condition may be that it becomes necessary to request the driver 3 to hold the steering wheel during autonomous driving of the vehicle 1. As a further example, the notification condition may be that it becomes necessary to request the driver 3 to switch to manual driving during autonomous driving of the vehicle 1. As a still further example, the notification condition may be that it becomes necessary to request the driver 3 to perform a braking operation. As a yet further example, the notification condition may be that the driver assistance control for assisting with driving of the vehicle 1 is activated. These pieces of information are obtained from a vehicle control system that controls the vehicle 1. The vehicle control system will be described later in Section 5.

When the notification condition is satisfied (step S100: YES), a notification N to the driver 3 is necessary, and the process proceeds to step S110. On the other hand, when the notification condition is not satisfied (step S100: NO), no notification N to the driver 3 is necessary, and the process in this cycle ends.

In step S110, the control device 50 first initializes the target level to the first level LV1. The control device 50 then controls the first visual device 20-1 to give the first visual notification NV1 from the first visual device 20-1. At this time, the control device 50 does not give any sound notification NA from the speaker 30.

In step S115, the control device 50 determines whether the driver 3 has reacted to the first visual notification NV1 within a certain period of time. For example, the reaction of the driver 3 is that the line of sight of the driver 3 approaches the first direction D1 to the first visual device 20-1. The reaction of the driver 3 may be that the line of sight of the driver 3 substantially coincides with the first direction D1 to the first visual device 20-1. As a further example, the reaction of the driver 3 may be that the level of alertness of the driver 3 recovers above the threshold. As a still further example, the reaction of the driver 3 may be that the driver 3 performs a requested operation. Examples of the operation that is requested to the driver 3 include holding the steering wheel, switching to manual driving, and operating the brakes. In any case, the control device 50 can detect whether the driver 3 has reacted to the first visual notification NV1, based on information obtained by the driver monitor 40.

When the driver 3 has reacted to the first visual notification NV1 (step S115: YES), the process in this cycle ends. On the other hand, when the driver 3 has not reacted to the first visual notification NV1 (step S115: NO), the process proceeds to step S120.

In step S120, the control device 50 sets (changes) the target level to the second level LV2. The control device 50 then controls the second visual device 20-2 to give the second visual notification NV2 from the second visual device 20-2. At this time, the control device 50 does not output any sound notification NA from the speaker 30.

In step S125, the control device 50 determines whether the driver 3 has reacted to the second visual notification NV2 within a certain period of time. For example, the reaction of the driver 3 is that the line of sight of the driver 3 approaches the second direction D2 to the second visual device 20-2. The reaction of the driver 3 may be that the line of sight of the driver 3 substantially coincides with the second direction D2 to the second visual device 20-2. As a further example, the reaction of the driver 3 may be that the level of alertness of the driver 3 recovers above the threshold. As a still further example, the reaction of the driver 3 may be that the driver 3 performs a requested operation. The control device 50 can detect whether the driver 3 has reacted to the second visual notification NV2, based on information obtained by the driver monitor 40. When the driver 3 has reacted to the second visual notification NV2 (step S125: YES), the process in this cycle ends. On the other hand, when the driver 3 has not reacted to the second visual notification NV2 (step S125: NO), the process proceeds to step S130.

In step S130, the control device 50 sets (changes) the target level to the third level LV3. The control device 50 then controls the speaker 30 to give a sound notification NA from the speaker 30.

In step S135, the control device 50 determines whether the driver 3 has reacted to the sound notification NA within a certain period of time. For example, the reaction of the driver 3 is that the level of alertness of the driver 3 recovers above the threshold. As another example, the reaction of the driver 3 may be that the driver 3 performs a requested operation. The control device 50 can detect whether the driver 3 has reacted to the sound notification NA, based on information obtained by the driver monitor 40. When the driver 3 has reacted to the sound notification NA (step S135: YES), the process in this cycle ends. On the other hand, when the driver 3 has not reacted to the sound notification NA (step S135: NO), the process proceeds to step S140.

In step S140, the control device 50 performs emergency control. For example, the control device 50 controls the vehicle 1 to stop at a safe place (e.g. on the shoulder).

3-2. Second Example

Figure 7:
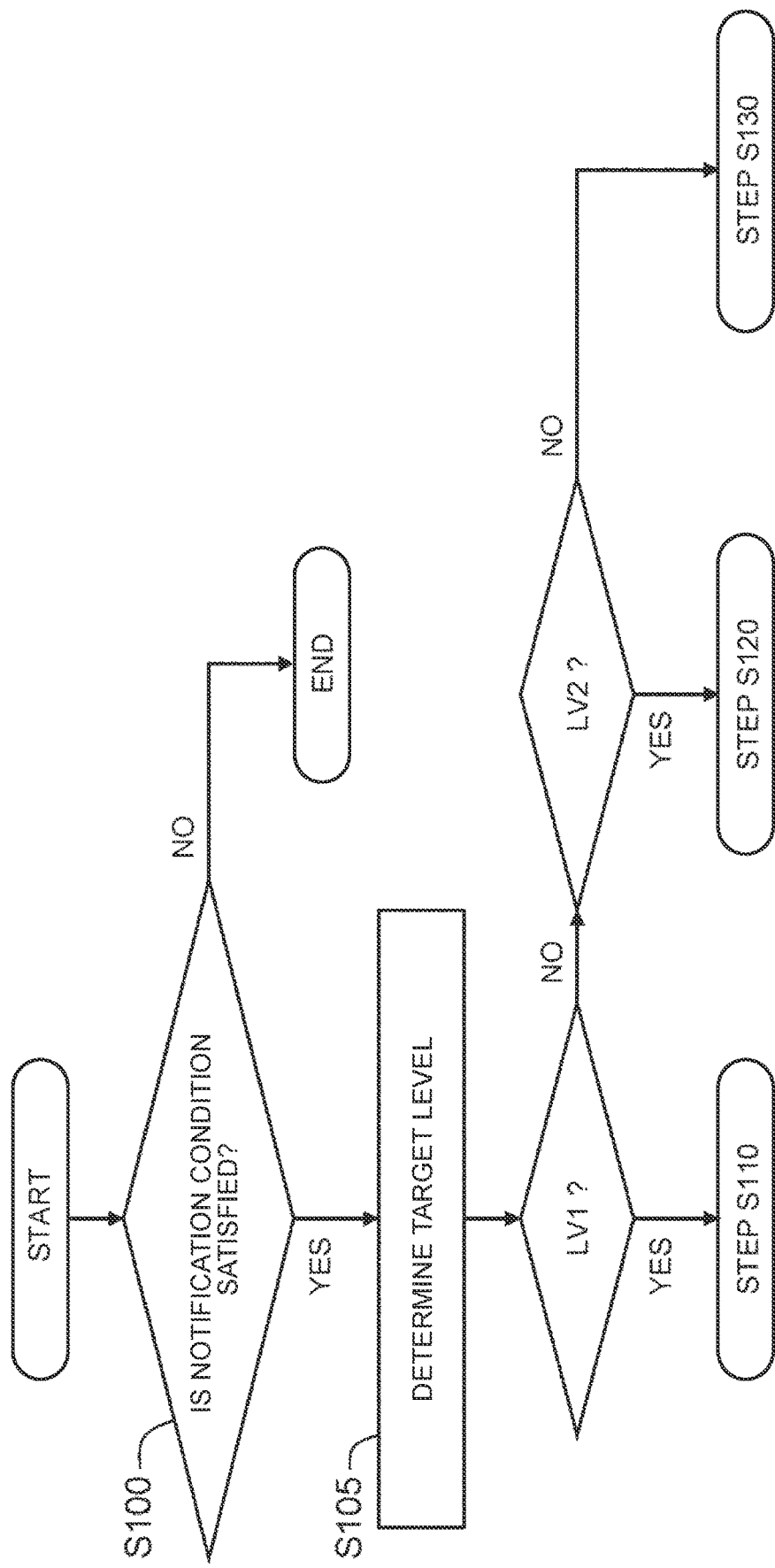
FIG. 7 is a flowchart showing a second example of the notification control process according to the embodiment.

FIG. 7 is a flowchart showing a second example of the notification control process. Step S100 is the same as that in the first example described above. When the notification condition is satisfied (step S100: YES), the process proceeds to step S105.

In step S105, the control device 50 determines (sets) the target level of the strength of a notification N based on the result in step S100. For example, the control device 50 compares the level of alertness of the driver 3 to a first threshold TH1, a second threshold TH2, and a third threshold TH3. The second threshold TH2 is lower than the first threshold TH1, and the third threshold TH3 is lower than the second threshold TH2 (TH1>TH2>TH3). When the level of alertness is lower than the first threshold TH1 and equal to or higher than the second threshold TH2, the target level is set to the first level LV1. When the level of alertness is lower than the second threshold TH2 and equal to or higher than the third threshold TH3, the target level is set to the second level LV2. When the level of alertness is lower than the third threshold TH3, the target level is set to the third level LV3.

When the target level is the first level LV1, the process proceeds to step S110 shown in FIG. 6. When the target level is the second level LV2, the process proceeds to step S120 shown in FIG. 6. When the target level is the third level LV3, the process proceeds to step S130 shown in FIG. 6.

4. Modifications

FIG. 8 is a conceptual diagram showing various patterns of the notification control process.

Pattern (A): When the target level is the first level LV1, the first visual notification NV1 is selected. When the target level is the second level LV2, the second visual notification NV2 is selected. When the target level is the third level LV3, a sound notification NA is selected.

Pattern (B): When the target level is the first level LV1, the first visual notification NV1 is selected. When the target level is the second level LV2 or the third level LV3, the second visual notification NV2 is selected.

Pattern (C): When the target level is the first level LV1 or the second level LV2, the first visual notification NV1 is selected. When the target level is the third level LV3, the second visual notification NV2 is selected.

Pattern (D): When the target level is the first level LV1, a visual notification NV is selected. The visual notification NV herein may be the first visual notification NV1 or may be the second visual notification NV2. When the target level is the second level LV2 or the third level LV3, a sound notification NA is selected.

Pattern (E): When the target level is the first level LV1 or the second level LV2, a visual notification NV is selected. The visual notification NV herein may be the first visual notification NV1 or may be the second visual notification NV2. When the target level is the third level LV3, a sound notification NA is selected.

The process flow described above in Section 3 is modified as appropriate for each pattern. The technical effects described above can be obtained with any of the patterns.

5. Vehicle Control System

5-1. Configuration Example

Figure 9:
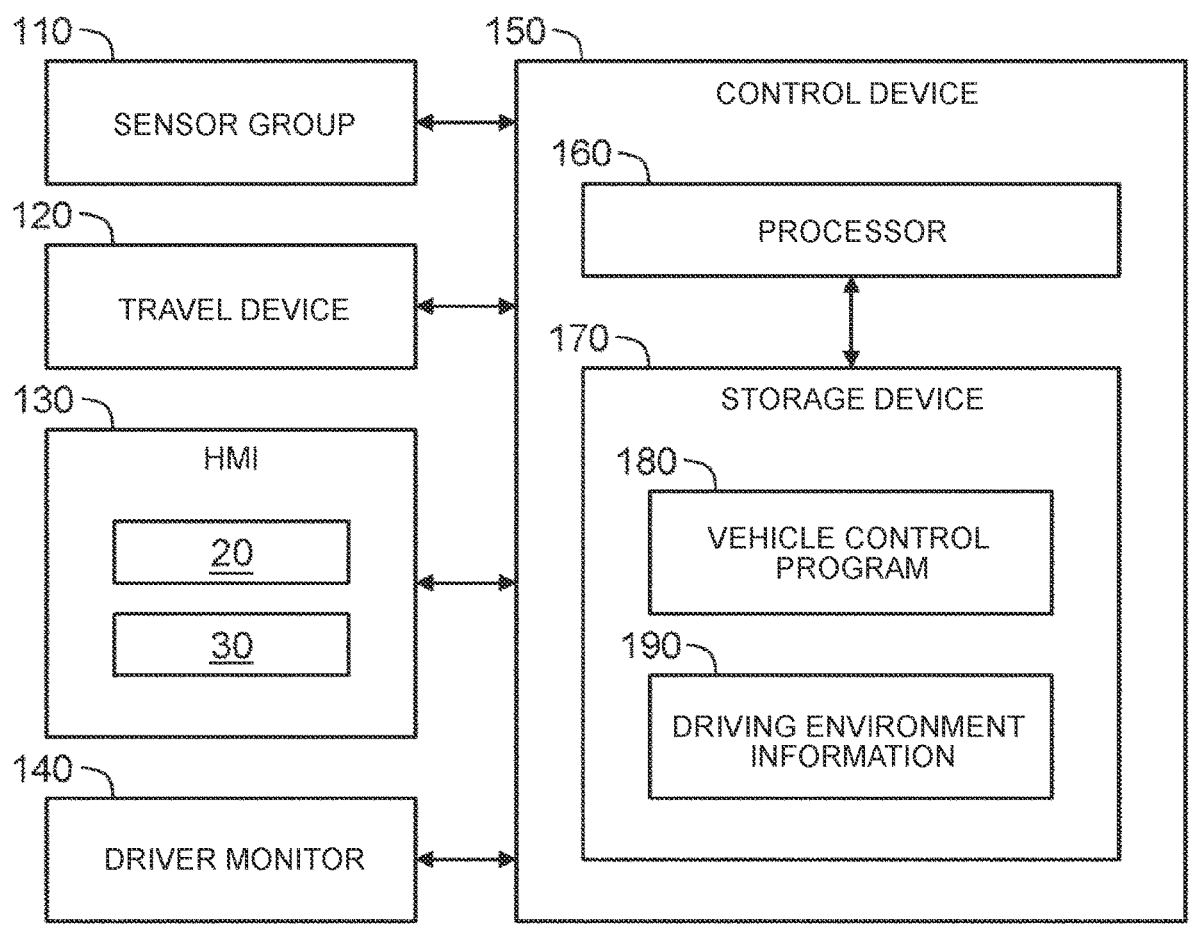
FIG. 9 is a block diagram showing an example of the configuration of a vehicle control system according to the embodiment.

FIG. 9 is a block diagram showing an example of the configuration of a vehicle control system 100 according to the present embodiment. The vehicle control system 100 includes the notification system 10 described above. The vehicle control system 100 includes a sensor group 110, a travel device 120, a Human Machine Interface (HMI) 130, a driver monitor 140, and a control device 150.

The sensor group 110 includes a perception sensor, a vehicle state sensor, a position sensor, etc. The perception sensor percepts (detects) the surroundings of the vehicle 1. Examples of the perception sensor include a camera, a Laser Imaging Detection and Ranging (LIDAR) sensor, and a radar. The vehicle state sensor detects the state of the vehicle 1. The vehicle state sensor includes a speed sensor, an acceleration sensor, a yaw rate sensor, a steering angle sensor, etc. The position sensor detects the position and orientation of the vehicle 1. For example, the position sensor includes a Global Navigation Satellite System (GNSS).

The travel device 120 includes a steering device, a drive device, and a braking device. The steering device steers wheels. For example, the steering device includes an electric power steering (EPS) system. The drive device is a power source that generates a driving force. Examples of the drive device include an engine, an electric motor, and in-wheel motors. The braking device generates a braking force.

The HMI 130 presents various kinds of information to the driver 3 and receives various kinds of information from the driver 3. The HMI 130 includes the visual device 20 and the speaker 30 that are described above. The HMI 130 further includes an input device such as a touch panel.

The driver monitor 140 includes the driver monitor 40 described above. That is, the driver monitor 140 includes a camera for capturing images of the driver 3, a steering touch sensor, etc. The driver monitor 140 may detect driving operations of the driver 3.

The control device 150 is a computer that controls the vehicle 1. The control device 150 includes one or more processors 160 (hereinafter simply referred to as "processor 160") and one or more storage devices 170 (hereinafter simply referred to as "storage device 170"). The processor 160 performs various processes. For example, the processor 160 includes a central processing unit (CPU). The storage device 170 stores various kinds of information. Examples of the storage device 170 include a volatile memory, a non-volatile memory, a hard disk drive (HDD), and a solid state drive (SSD). The control device 150 includes the control device 50 of the notification system 10.

A vehicle control program 180 is a computer program that is executed by the processor 160. The functions of the control device 150 are implemented through cooperation between the processor 160 that executes the vehicle control program 180 and the storage device 170. The vehicle control program 180 is stored in the storage device 170. Alternatively, the vehicle control program 180 may be recorded on a computer-readable recording medium.

5-2. Driving Environment Information

The control device 150 acquires driving environment information 190 using the sensor group 110. The driving environment information 190 indicates the driving environment of the vehicle 1. The driving environment information 190 is stored in the storage device 170.

The driving environment information 190 includes surroundings information that indicates the perception results from the perception sensor. For example, the surroundings information includes images captured by a camera. The surroundings information may include object information on objects around the vehicle 1. Examples of the objects around the vehicle 1 include pedestrians, other vehicles (preceding vehicles, parked vehicles, etc.), white lines, traffic lights, signs, and roadside structures. The object information indicates the relative positions and relative speeds of the objects with respect to the vehicle 1.

The driving environment information 190 further includes vehicle state information indicating the state of the vehicle 1 detected by the vehicle state sensor.

The driving environment information 190 further includes vehicle position information indicating the position and orientation of the vehicle 1. The vehicle position information is obtained by the position sensor. Accurate vehicle position information may be acquired by localization using map information and the surroundings information (object information).

The driving environment information 190 further includes information obtained by the driver monitor 140.

5-3. Vehicle Travel Control

The control device 150 performs vehicle travel control for controlling travel of the vehicle 1. The vehicle travel control includes steering control, drive control, and braking control. The control device 150 performs the vehicle travel control by controlling the travel device 120 (steering device, drive device, and braking device).

The control device 150 may perform autonomous driving control based on the driving environment information 190. More specifically, the control device 150 generates a travel plan for the vehicle 1 based on the driving environment information 190. The control device 150 also generates a target trajectory that is necessary for the vehicle 1 to travel according to the travel plan, based on the driving environment information 190. The target trajectory includes a target position and a target speed. The control device 150 then performs the vehicle travel control so that the vehicle 1 follows the target trajectory.

The control device 150 may perform the driver assistance control for assisting with driving of the vehicle 1, based on the driving environment information 190. Examples of the driver assistance control include collision avoidance control and lane departure prevention control. The collision avoidance control controls either or both of steering and deceleration in order to assist with avoidance of a collision between the vehicle 1 and any surrounding object. The lane departure prevention control controls steering in order to reduce the possibility of the vehicle 1 departing from its lane. When a condition to activate the driver assistance control is satisfied, the control device 150 activates the driver assistance control.

The collision avoidance control will be described as an example of the driver assistance control. The control device 150 perceives an object to be avoided in front of the vehicle 1 (e.g., a surrounding vehicle or a pedestrian) based on the surroundings information. The control device 150 also predicts the future positions of both the vehicle 1 and the object to be avoided based on the vehicle state information and the surroundings information, and calculates the possibility of the vehicle 1 colliding with the object to be avoided. A condition to activate the collision avoidance control is that the possibility of the vehicle 1 colliding with the object to be avoided becomes higher than an activation threshold.

The lane departure prevention control will be described as another example of the driver assistance control. For example, when the vehicle 1 drifts toward a lane marking (white line) of its lane, the lane departure prevention control controls steering so that the vehicle 1 returns to the center of its lane. For this purpose, the control device 150 perceives the lane markings of the lane in which the vehicle 1 is traveling based on the surroundings information, and monitors the distances between the vehicle 1 and the lane markings. A condition to activate the lane departure prevention control is that the distance between the vehicle 1 and one of the lane markings become less than a predetermined distance threshold.

5-4. Notification Control

The control device 150 controls notifications N to the driver 3 by controlling the HMI 130 (visual device 20, speaker 30) (see Sections 2 to 4). More specifically, the control device 150 gives a notification N to the driver 3 when a predetermined notification condition is satisfied.

For example, the notification condition is that the level of alertness of the driver 3 falls below a threshold. The control device 150 can calculate the level of alertness of the driver 3 based on information obtained by the driver monitor 140.

As another example, the notification condition is that any sign of drowsiness of the driver 3 is detected. The control device 150 can detect signs of drowsiness of the driver 3 based on images captured by the camera of the driver monitor 140.

As still another example, the notification condition may be that it becomes necessary to request the driver 3 to monitor the surroundings during autonomous driving of the vehicle 1. As yet another example, the notification condition may be that it becomes necessary to request the driver 3 to hold the steering wheel during autonomous driving of the vehicle 1. As a further example, the notification condition may be that it becomes necessary to request the driver 3 to switch to manual driving during autonomous driving of the vehicle 1. As a still further example, the notification condition may be that it becomes necessary to request the driver 3 to perform a braking operation. As a yet further example, the notification condition may be that the driver assistance control is activated.

When the notification condition is satisfied, the control device 150 gives a notification N of appropriate strength corresponding to the target level to the driver 3.

What is claimed is:

1. A notification method for giving a notification to a driver sitting in a driver's seat of a vehicle, the method comprising:
    setting a target level of strength of the notification;
    when the target level is a first level, giving a visual notification from a visual device of the vehicle without giving a sound notification from a speaker of the vehicle; and
    when the target level is higher than the first level, giving a strong visual notification from the visual device, the strong visual notification being stronger than the visual notification that is given when the target level is the first level,
    wherein when the target level is the first level: (i) the sound notification is not given from the speaker, and (ii) a first visual notification is given from a first visual device, wherein the visual device comprises the first visual device;
    when the target level is a second level: (i) the sound notification is not given from the speaker, and (ii) a second visual notification is given from a second visual device, wherein the visual device comprises the second visual device, and the second level being higher than the first level; and
    a first angle between a direction from the driver's seat toward the first visual device and a forward direction is greater than a second angle between a direction from the driver's seat toward the second visual device and the forward direction.

2. The notification method according to claim 1, wherein:
    the first angle is greater than a reference angle and smaller than a limit angle, the reference angle being half an angle of a human's average effective visual field, and the limit angle being half an angle of a human's average visual field; and
    the second angle is smaller than the reference angle.

3. The notification method according to claim 1, wherein when the target level is a third level, the sound notification is given from the speaker, the third level being higher than the second level.

4. The notification method according to claim 3, further comprising:
    determining whether the notification to the driver is necessary;
    determining whether the driver reacts to the first visual notification; and
    determining whether the driver reacts to the second visual notification, wherein
    when the notification to the driver is necessary, the target level is initialized to the first level,
    when the driver does not react to the first visual notification, the target level is set to the second level, and
    when the driver does not react to the second visual notification, the target level is set to the third level.

5. The notification method according to claim 1, further comprising:
    determining whether the notification to the driver is necessary; and
    determining whether the driver reacts to the visual notification when the target level is the first level, wherein
    when the notification to the driver is necessary, the target level is initialized to the first level, and
    when the driver does not react to the visual notification, the target level is set to a level higher than the first level.

6. A notification system that gives a notification to a driver sitting in a driver's seat of a vehicle, the notification system comprising one or more processors, wherein:
    the one or more processors are configured to set a target level of strength of the notification;
    the one or more processors are configured to, when the target level is a first level, give a visual notification from a visual device of the vehicle without giving a sound notification from a speaker of the vehicle; and
    the one or more processors are configured to, when the target level is higher than the first level, give a strong visual notification from the visual device, the strong visual notification being stronger than the visual notification that is given when the target level is the first level,
    wherein when the target level is the first level: (i) the sound notification is not given from the speaker, and (ii) a first visual notification is given from a first visual device, wherein the visual device comprises the first visual device;
    when the target level is a second level: (i) the sound notification is not given from the speaker, and (ii) a second visual notification is given from a second visual device, wherein the visual device comprises the second visual device, and the second level being higher than the first level; and
    a first angle between a direction from the driver's seat toward the first visual device and a forward direction is greater than a second angle between a direction from the driver's seat toward the second visual device and the forward direction.

7. A vehicle comprising:
    a visual device;
    a speaker; and
    a control device that is configured to control a notification to a driver sitting in a driver's seat, wherein
    the control device is configured to set a target level of strength of the notification, the control device is configured to, when the target level is a first level, give a visual notification from the visual device without giving a sound notification from the speaker, and the control device is configured to, when the target level is higher than the first level, give a strong visual notification from the visual device, the strong visual notification being stronger than the visual notification that is given when the target level is the first level, wherein when the target level is the first level: (i) the sound notification is not given from the speaker, and (ii) a first visual notification is given from a first visual device, wherein the visual device comprises the first visual device;

when the target level is a second level: (i) the sound notification is not given from the speaker, and (ii) a second visual notification is given from a second visual device, wherein the visual device comprises the second visual device, and the second level being higher than the first level; and a first angle between a direction from the driver's seat toward the first visual device and a forward direction is greater than a second angle between a direction from the driver's seat toward the second visual device and the forward direction.

* * * * *